(12) United States Patent
Meng (10) Patent No.: US 12,334,597 B2
(45) Date of Patent: Jun. 17, 2025

(54) BATTERY CELL AND ELECTRIC DEVICE

(71) Applicant: Ningde Amperex Technology Limited, Ningde (CN)

(72) Inventor: Chunlei Meng, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 346 days.

(21) Appl. No.: 17/560,815

(22) Filed: Dec. 23, 2021

(65) Prior Publication Data
US 2022/0209374 A1  Jun. 30, 2022

(51) Int. Cl.
*H01M 50/54* (2021.01)
*H01M 50/536* (2021.01)

(52) U.S. Cl.
CPC ......... *H01M 50/54* (2021.01); *H01M 50/536* (2021.01)

(58) Field of Classification Search
CPC ............. H01M 50/536; H01M 50/538; H01M 10/0587; H01M 50/54
See application file for complete search history.

(56) References Cited

U.S. PATENT DOCUMENTS

| | | |
|---|---|---|
| 2012/0058373 A1 | 3/2012 | Morikawa et al. |
| 2013/0164585 A1* | 6/2013 | Kwak ................. H01M 50/262 429/96 |
| 2013/0280569 A1* | 10/2013 | Mori ...................... H01G 11/80 429/94 |
| 2019/0288324 A1* | 9/2019 | Jiang .................. H01M 10/0431 |
| 2020/0287195 A1* | 9/2020 | Kim ....................... H01M 50/55 |

FOREIGN PATENT DOCUMENTS

| | | |
|---|---|---|
| CN | 207009539 U | 2/2018 |
| CN | 108281609 A | 7/2018 |
| CN | 109004236 A | 12/2018 |
| CN | 110739433 A | 1/2020 |
| CN | 210092161 U | 2/2020 |
| CN | 111509148 A | 8/2020 |
| CN | 212209645 U | 12/2020 |

OTHER PUBLICATIONS

CN1-202011552484-2-OA1mailed Sep. 30, 2021.

* cited by examiner

*Primary Examiner* — Brittany L Raymond
(74) *Attorney, Agent, or Firm* — Maier & Maier, PLLC (57) ABSTRACT

A battery cell includes an electrode assembly and a housing accommodating the electrode assembly. The electrode assembly includes a first electrode plate and a second electrode plate. The first electrode plate includes a current collector, a connecting piece, and a tab. The current collector includes a plurality of stacked flat portions. A fixed end of the connecting piece is connected to one of the flat portions. A free end of the connecting piece is disposed toward the flat portion. The free end is flexibly bendable against the current collector. A first end of the tab is fixed to the connecting piece, and a second end of the tab is disposed beyond the flat portion.

18 Claims, 5 Drawing Sheets

BATTERY CELL AND ELECTRIC DEVICE

CROSS-REFERENCE TO RELATED APPLICATIONS

The present application claims priority to Chinese Patent Application No. 202011552484.2, filed on Dec. 24, 2020, the content of which is incorporated herein by reference in its entirety.

TECHNICAL FIELD

The present application relates to the technical field of batteries, and in particular, to a battery cell and an electric device.

BACKGROUND

A battery cell is a device that converts external energy into electrical energy and stores the electrical energy internally so that the electrical energy can be supplied to an external electric device (such as a portable electronic device) when necessary. Currently, battery cells are widely used in electric devices such as a mobile phone, a tablet, and a notebook computer.

Generally, a battery cell includes a housing assembly and an electrode assembly disposed in the housing assembly. The electrode assembly generally includes a positive electrode plate and a negative electrode plate that are alternately arranged, and includes a separator disposed between the positive electrode plate and the negative electrode plate to separate the two electrode plates. An electrode plate (a positive electrode plate or a negative electrode plate) includes a current collector, a tab with one end welded to the current collector and with the other end extending out of the current collector, and an active electrode material layer disposed on the current collector.

In a process of implementing the present application, it is found that currently the tab is fixed to the electrode plate by using a welding technique such as laser welding, ultrasonic welding, and the like. When the user accidentally drops the battery cell or an electric device containing the battery cell, a welding position between the tab and the current collector is prone to be damaged by an impact force generated by the drop, thereby leading to failure of the tab caused by a loose weld.

SUMMARY

An objective of the present application is to provide a battery cell and an electric device to reduce the risks of failure of a tab caused by dropping of the battery cell or a product containing the battery cell.

The present application puts forward the following technical solution to achieve the foregoing objective.

A battery cell is disclosed, including an electrode assembly and a housing accommodating the electrode assembly. The electrode assembly includes a first electrode plate and a second electrode plate alternately arranged. The first electrode plate includes a current collector, a connecting piece, and a tab. The current collector includes a plurality of stacked flat portions. The connecting piece includes a fixed end and a free end. The fixed end is connected to one of the flat portions. The free end is disposed toward the connected flat portion and is close to or fits snugly with the connected flat portion, and the free end is flexibly bendable against the current collector. A first end of the tab is fixed to the free end, and a second end of the tab is disposed beyond the flat portion.

As a further improvement of the foregoing solution, the connecting piece and the current collector are integrally formed.

As a further improvement of the foregoing solution, the connecting piece is formed by extending outward from an edge of the connected flat portion, and is bent toward the connected flat portion until being close to or fitting snugly with the connected flat portion.

As a further improvement of the foregoing solution, the connecting piece includes a fixed end fixed to the current collector and a free end far away from the fixed end.

A direction in which the fixed end points to the free end is opposite to a direction in which the first end points to the second end.

As a further improvement of the foregoing solution, an inner end of the current collector at a center of the electrode assembly is located in a flat portion of the current collector. The connecting piece is connected to the inner end. The connecting piece is formed by extending outward from a lengthwise edge of the current collector and is bent toward the inner end until being close to or fitting snugly with the inner end.

As a further improvement of the foregoing solution, an inner end of the current collector at a center of the electrode assembly is located in a flat portion of the current collector. The connecting piece is connected to the inner end. The connecting piece is formed by extending outward from a widthwise edge of the current collector and is bent toward the inner end until being close to or fitting snugly with the inner end.

As a further improvement of the foregoing solution, the electrode plate further includes an active electrode material layer, and a surface of the current collector is coated with the active electrode material layer.

As a further improvement of the foregoing solution, a region of the connected flat portion, which is directly oriented toward the connecting piece, is not coated with the active electrode material layer.

As a further improvement of the foregoing solution, one of the first electrode plate or the second electrode plate is a positive electrode piece, and the other is a negative electrode piece.

The present application further puts forward the following technical solution to achieve the foregoing objective.

An electric device is disclosed, including the foregoing battery cell and a load, and the battery cell supplies power to the load.

Beneficial effects of the present application are as follows:

The electrode assembly of the battery cell provided in the embodiments of the present application includes a first electrode plate and a second electrode plate that are alternately arranged. The first electrode plate includes a current collector, a connecting piece, and a tab. The current collector includes a plurality of stacked flat portions. The connecting piece is connected to one of the flat portions. A free end of the connecting piece is disposed toward the connected flat portion and is close to or fits snugly with the connected flat portion. The free end of the connecting piece is flexibly bendable against the current collector. A first end of the tab is fixed to the connecting piece, and a second end of the tab is disposed beyond the flat portion.

In the electrode assembly of the battery cell provided in the embodiments of the present application, the tab is not directly welded to the current collector, but is indirectly connected to the current collector by being fixed to a connecting piece that is connected to the current collector. On the one hand, the free end of the connecting piece is flexibly bendable against the current collector, and is flexibly movable in a given space. Therefore, when a battery cell or electric device containing the electrode plate accidentally drops, the connecting piece can transfer the impact on the tab to the electrode plate, thereby reducing the risks of a loose weld of the tab. On the other hand, a process by which the connecting piece is bent flexibly and absorbs energy can relieve the impact force on the electrode plate to some extent, and reduce the risks of detaching the connecting piece from the current collector, that is, the risks of detaching the tab from the current collector. In conclusion, the battery cell provided in the embodiments of the present application can effectively reduce the risks of failure of the tab caused by dropping of the battery cell or a product containing the battery cell.

BRIEF DESCRIPTION OF DRAWINGS

One or more embodiments are described exemplarily with reference to the drawings corresponding to the embodiments. The exemplary description does not constitute any limitation on the embodiments. Components marked with the same reference numeral in the drawings represent similar components. Unless otherwise specified, the drawings do not constitute any scale limitation.

REFERENCE NUMERALS

1. Electrode assembly;
100. Electrode plate;
100*a*. First electrode plate;
100*b*. Second electrode plate;
110. Current collector;
120. Connecting piece;
130. Tab;
140. Active electrode material layer;
101. Lengthwise edge;
102. Widthwise edge;
103. Thickness-wise edge;
111. Main surface;
112; Rear surface;
113. Flat portion;
114. Curved portion;
121. Fixed end;
122. Free end;
131. First end;
132. Second end;
100'. Electrode plate;
112'. Rear surface;
120'. Connecting piece;
140'. Active electrode material layer;
100". Electrode plate;
110". Current collector;
111". Main surface;
120". Connecting piece;
140". Active electrode material layer;
100"'. Electrode plate;
111"'. Main surface;
120"'. Connecting piece;
140"'. Active electrode material layer;
200. Separator;
2. Battery cell;
21. Housing; and
3. Electric device.

DETAILED DESCRIPTION

For ease of understanding the present application, the following describes the present application in more detail with reference to drawings and specific embodiments. It needs to be noted that an element referred to herein as "fixed to" or "fixed connected to" or "mounted to" another element may directly exist on the other element directly, or may be fixed to the other element through one or more intermediate elements. An element referred to herein as "connected to" another element may be connected to the other element directly or through one or more intermediate elements. The terms "vertical", "horizontal", "left", "right", "in", "out" and other similar expressions used herein are merely for ease of description.

Unless otherwise defined, all technical and scientific terms used herein have the same meanings as usually understood by a person skilled in the technical field of the present application. The terms used in the specification of the present application are merely intended for describing specific embodiments but not intended for limiting the present application. The term "and/or" used herein is intended to include any and all combinations of one or more related items preceding and following the term.

In addition, the technical features mentioned in different embodiments of the present application described below may be combined with each other so long as they do not conflict with each other.

In this specification, the meaning of "mounting" includes fixing or confining an element or device to a specific position or place by welding, screwing, snap-fitting, bonding, and the like, where the element or device may be held stationary in the specific position or place or may move within a limited range, and the element or device may be detachable or undetachable after being fixed or confined to the specific position or place. This is not limited in the embodiments of the present application.

Figure 1:
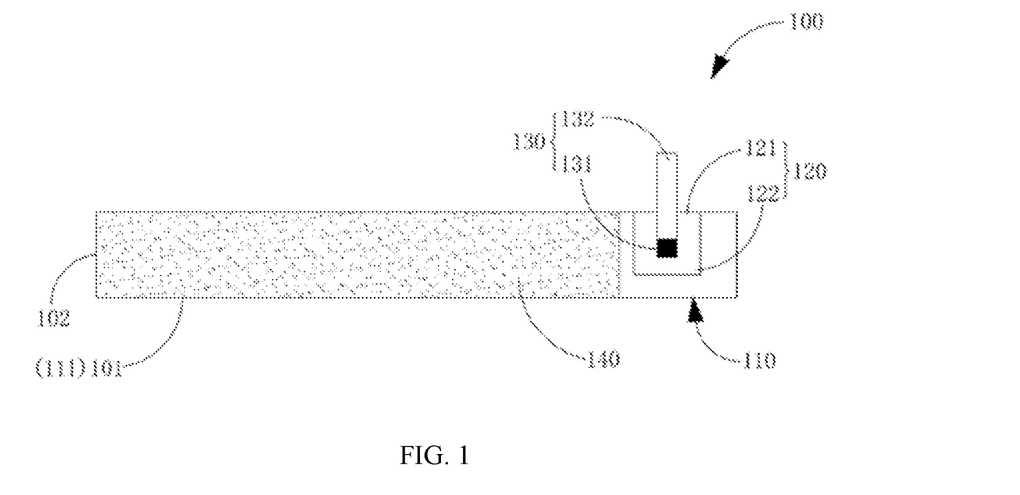
FIG. 1 is a schematic front view of an electrode plate according to an embodiment of the present application.
Figure 2:
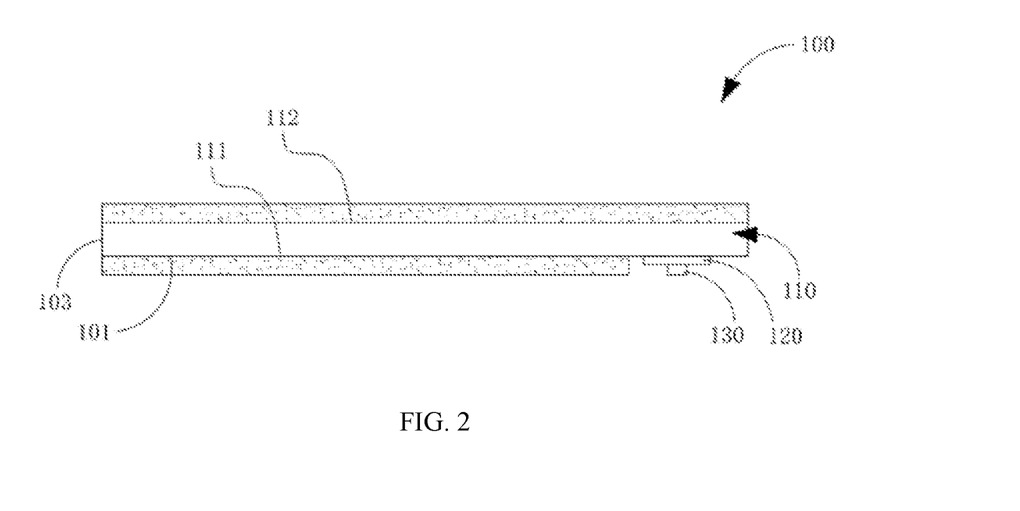
FIG. 2 is a schematic top view of the electrode plate shown in FIG. 1.

Referring to FIG. 1 and FIG. 2, which are schematic diagrams of an electrode plate 100 viewed from two directions respectively according to an embodiment of the present application, the electrode plate 100 includes a current collector 110, a connecting piece 120, and a tab 130. The current collector 110 includes a main surface 111 defined by a lengthwise edge 101 and a widthwise edge 102 of the current collector. The connecting piece 120 is disposed toward the main surface 111, and is close to or fits snugly with the main surface 111. The connecting piece 120 includes a fixed end 121 fixed to the current collector 110. A free end 122 of the connecting piece 120 is flexibly bendable against the current collector 110. A first end 131 of the tab 130 is fixed to the free end 122 of the connecting piece 120. A second end 132 is so disposed as to extend beyond the lengthwise edge 101 along an extension direction of the widthwise edge 102 of the current collector 110.

Referring to FIG. 1 and FIG. 2, the current collector 110 is a core part of the electrode plate 100, and the current collector 110 as a whole is in a flat sheet-like structure. The current collector 110 is approximately in a thin cuboid shape, and can be wound into a cylindrical shape or an elliptical cylindrical shape due to good flexibility. The current collector 110 includes a lengthwise edge 101, a widthwise edge 102, and a thickness-wise edge 103. The lengthwise edge 101 is an edge line of the current collector in an extension direction of the current collector 110. The widthwise edge 102 is an edge line of the current collector, which is parallel to the width direction of the current collector 110 after the current collector 110 is expanded flat. The thickness-wise edge 103 is an edge line of the current collector, which is parallel to the thickness direction of the current collector 110 after the current collector 110 is expanded flat. The lengthwise edge 101 and the widthwise edge 102 jointly define the main surface 111 and a rear surface 112 opposite to the main surface 111. The main surface 111 and the rear surface 112 are two largest surfaces of the current collector 110.

Further, referring to FIG. 1 and FIG. 2, the connecting piece 120 is disposed toward the main surface 111. The connecting piece 120 as a whole is close to the main surface 111 or fully fits snugly with the main surface 111. The connecting piece 120 includes a fixed end 121 and a free end 122. The fixed end 121 is fixed to the current collector 110. The free end 122 fits snugly with the main surface 111 or is spaced apart from the main surface 111 by a tiny gap. The connecting piece 120 is made of a flexible material. The free end 122 is flexibly bendable against the current collector 110, so that the free end 122 comes closer to or away from the main surface 111 of the current collector 110 by moving against the main surface 111. That is, the free end 122 is a movable part of the connecting piece 120. It needs to be noted that the free end 122 is bendable by using the fixed end 121 as a fulcrum, or flexibly bendable by using another part as a fulcrum.

Figure 3:
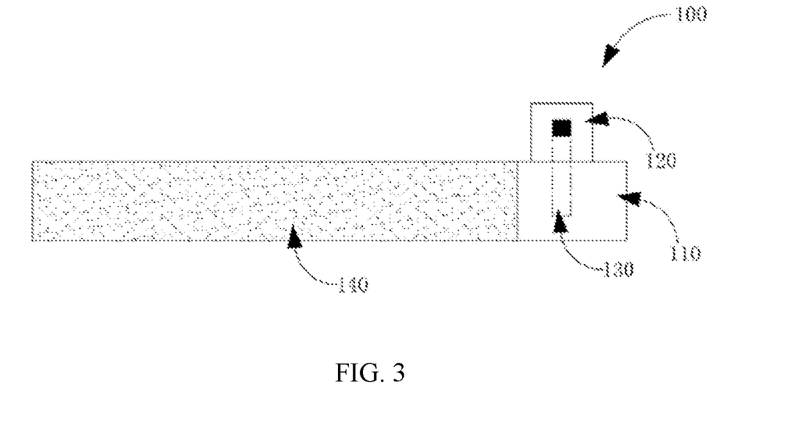
FIG. 3 is a schematic diagram of a state of the electrode plate shown in Table 1 after the electrode plate is fully formed and before a connecting piece is disposed toward a main surface of a current collector.

In this embodiment, the connecting piece 120 and the current collector 110 are integrally formed. Specifically, referring to FIG. 3, which is a schematic diagram of a state of an electrode plate 100 after the electrode plate is fully formed and before a connecting piece is disposed toward a current collector 110, and referring to FIG. 1 and FIG. 2, the connecting piece 120 is disposed on the lengthwise edge 101 of the current collector 110, and is formed by extending out of the current collector 110 from the lengthwise edge 101. Before the electrode plate 100 is fully formed, the connecting piece 120 and the current collector 110 form a hollow T-shaped structure. Thereafter, the connecting piece 120 is bent toward the main surface 111 until being close to or fitting snugly with the main surface 111, as shown in FIG. 1 and FIG. 2. Preferably, to avoid interfering with the current collector 110 during the bending of the connecting piece 120, the bend of the connecting piece 120 may be at a given distance Such as 3 millimeters (mm) away from the lengthwise edge. In this case, a connecting portion is formed between the bend of the connecting piece 120 and the lengthwise edge 101. The connecting piece 120 is fixed to the current collector 110 through the connecting portion. One end of the connecting piece 120, which is close to the connecting portion, is the fixed end 121, and the other end of the connecting piece 120, which is far away from the connecting portion and free is the free end 122.

Understandably, even though the connecting piece 120 in the foregoing embodiment is integrally formed on the lengthwise edge of the current collector 110, the present application is not limited to this. In other embodiments of the present application, the connecting piece 120 may be integrally formed on the widthwise edge at an end of the current collector 110. Specifically, the connecting piece 120 is formed by extending outward from the widthwise edge of the current collector 110, and is bent toward the main surface 111 until being close to or fitting snugly with the main surface 111. In addition, in other embodiments of the present application, the connecting piece 120 and the current collector 110 are not necessarily integrally formed, but may be two separate parts. The connecting piece 120 is fixed to the current collector 110 by welding, bonding and other means.

Referring to FIG. 1, the tab 130 includes a first end 131 and a second end 132 that are opposite to each other. The first end 131 is fixed to the connecting piece 120, and the second end 132 is so disposed as to extend beyond the lengthwise edge 101 in a direction parallel to an extension direction of the widthwise edge 102. In this embodiment, the first end 131 is welded and fixed to a side of the connecting piece 120, where the side is back from the current collector 110 and the welding may be laser welding or ultrasonic welding. Preferably, the direction in which the first end 131 points to the second end 132 (hereinafter referred to as a first direction) is opposite to the direction in which the fixed end 121 points to the free end 122 (hereinafter referred to as a second direction). After the electrode plate 100 is wound into an electrode assembly (not shown in the drawing), the second end 132 of the tab 130 generally faces upward, that is, faces back from the ground. If the first direction is the same as the second direction, the connecting piece 120 may splay out downward far away from the main surface 111 under the effect of gravity. Even if the tab 130 remains relatively stable after the electrode plate 100 is wound, such a situation may still affect the stability of the tab 130. The arrangement of making the first direction opposite to the second direction can strengthen the stability of the tab 130 to some extent. Optionally, referring to FIG. 3, before the connecting piece 120 comes close to or fits snugly with the main surface 111 by bending, the tab 130 in this embodiment is welded and fixed to the side that is of the connecting piece 120 and back from the main surface 111, and is then located at a side close to the main surface 111 through a bending process of the connecting piece 120. Nevertheless, in other embodiments, the welding process of the tab 130 may be performed after completion of bending the connecting piece 120.

Further, the electrode plate 100 further includes an active electrode material layer 140. The main surface 111 and the rear surface 112 are coated with the active electrode material layer, so that the current collector 110, the active electrode material layer 140, and the tab 130 combine into a complete electrode plate 100. It needs to be noted that the electrode plate 100 may be a positive electrode or a negative electrode.

The material of the active electrode material layer 140 varies depending on the type of the positive electrode plate or the negative electrode plate.

Figure 4:
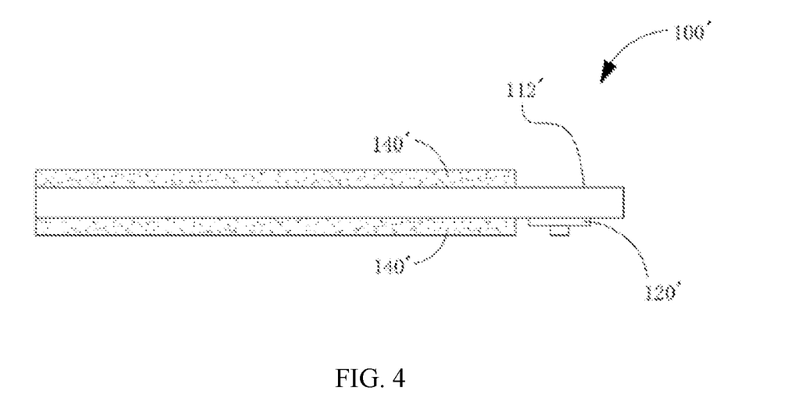
FIG. 4 is a schematic diagram of an electrode plate viewed from one direction of the electrode plate according to another embodiment of the present application.
Figure 5:
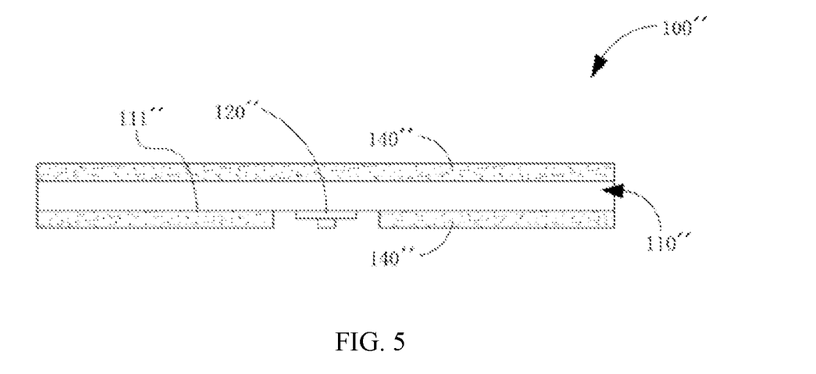
FIG. 5 is a schematic diagram of an electrode plate viewed from one direction of the electrode plate according to still another embodiment of the present application.
Figure 6:
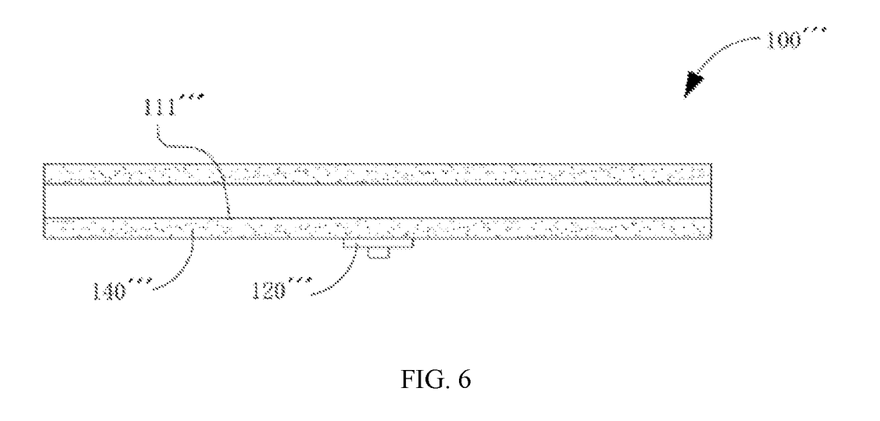
FIG. 6 is a schematic diagram of an electrode plate viewed from one direction of the electrode plate according to yet another embodiment of the present application.

Optionally, a region of the main surface 111, which is directly oriented toward the connecting piece 120, is not coated with the active electrode material layer 140, and thereby forms a blank region. In this way, the connecting piece 120 may fit snugly with the main surface 111 to prevent the connecting piece 120 from protruding out of the active electrode material layer 140 or to reduce the height by which the connecting piece 120 protrudes out of the active electrode material layer 140. Therefore, the thickness of the electrode plate 100 at the connecting piece 120 is substantially identical to the thickness at other positions, thereby ensuring good consistency of thickness of the electrode plate 100 at different positions, and facilitating the winding of the electrode plate. In this embodiment, along the direction in which the lengthwise edge 101 extends, the connecting piece 120 is disposed at the end of the current collector 110, and specifically at a right end of the current collector, as shown in the drawing. Correspondingly, no active electrode material layer 140 is disposed at a right end of the main surface 111. Understandably, a person skilled in the art can make appropriate variations on the basis of this embodiment. For example, FIG. 4 is a schematic diagram of an electrode plate 100' according to another embodiment of the present application. This embodiment differs from the preceding embodiment primarily in that: no active electrode material layer 140' is disposed in a region corresponding to the connecting piece 120' and situated on the rear surface 112' of the electrode plate 100' either. In this case, the connecting piece 120' is still so disposed as to fit snugly with the main surface 111". For another example, FIG. 5 is a schematic diagram of an electrode plate 100" according to still another embodiment of the present application. The electrode plate 100" differs from the foregoing electrode plate 100 primarily in that: along the direction in which the lengthwise edge 101 extends, the connecting piece 120" in the electrode plate 100" is disposed in the middle of the current collector 110", that is, between two ends of the current collector 110". Correspondingly, no active electrode material layer 140" is disposed at a position corresponding to the connecting piece 120" and situated in the middle of the main surface 111", so as to form a groove that accommodates the connecting piece 120". In this case, the connecting piece 120" may be so disposed as to fit snugly with the main surface 111". For another example, FIG. 6 is a schematic diagram of an electrode plate 100' according to yet another embodiment of the present application. The electrode plate 100' differs from the foregoing electrode plate 100" primarily in that: the main surface 111'" of the electrode plate 100'" is coated with the active electrode material layer 140', and is fully overlaid with the active electrode material layer 140', and the connecting piece 120' fits snugly with the surface of the active electrode material layer 140'". In this case, the connecting piece 120' is disposed close to the main surface 111", and the connecting piece 120'" and the main surface 111" are interspaced with the active electrode material layer 140'".

The electrode plate 100 according to this embodiment of the present application includes a current collector 110, a connecting piece 120, and a tab 130. The current collector 110 includes a main surface 111 defined by a lengthwise edge 101 and a widthwise edge 102 of the current collector 110. The connecting piece 120 is disposed toward the main surface 111, and is close to or fully fits snugly with the main surface 111. The connecting piece 120 includes a fixed end 121 fixed to the current collector 110, and a free end 122. The free end 122 is flexibly bendable against the current collector 110. A first end 131 of the tab 130 is fixed to the connecting piece 120. A second end 132 is so disposed as to extend beyond the lengthwise edge 101 of the current collector 110 along an extension direction of the widthwise edge 102.

In the electrode plate 100 according to this embodiment of the present application, the tab 130 is not directly welded to the current collector 110, but is indirectly connected to the current collector 110 by being fixed to a connecting piece 120 that is connected to the current collector 110. On the one hand, the connecting piece 120 is flexibly bendable against the current collector 110, and is flexibly movable in a given space. Therefore, when a battery cell or electric device containing the electrode plate 100 accidentally drops, the fixed end 121 of the connecting piece 120 is most prone to receive an impact. That is, the connecting piece 120 can transfer the impact on the tab 130 to the connecting piece 120, thereby reducing the risks of a loose weld of the tab 130. On the other hand, a process by which the connecting piece 120 of the electrode plate 100 is bent flexibly and absorbs energy can relieve the impact force on the electrode plate 100 to some extent, and reduce the risks of detaching the fixed end 121 from the current collector 110, that is, the risks of detaching the tab from the current collector. In conclusion, the electrode plate according to this embodiment of the present application can effectively reduce the risks of failure of the tab caused by dropping of the battery cell or an electric device containing the battery cell.

Based on the same inventive concept, the present application further provides an electrode assembly 1. For details, referring to FIG. 7, which is a schematic top view of the electrode assembly 1, the electrode assembly 1 includes a first electrode plate 100a, a second electrode plate 100b, and a separator 200. The first electrode plate 100a, the second electrode plate 100b, and the separator 200 are stacked and wound into a cylindrical shape or a column shape with a waist-shaped cross section. The first electrode plate 100a and the second electrode plate 100b are alternately arranged, of which one is a positive electrode plate and the other is a negative electrode plate. The separator 200 is disposed between the first electrode plate 100a and the second electrode plate 100b to avoid electrical contact between the first electrode plate 100a and the second electrode plate 100b.

Referring to FIG. 1 to FIG. 7, in this embodiment, the first electrode plate 100a is the electrode plate 100 described in the preceding embodiment, and includes a current collector 110, a connecting piece 120, a tab 130, and an active electrode material layer 140. The following describes the current collector 110, the connecting piece 120, the tab 130, and the active electrode material layer 140 in the wound first electrode plate 100a sequentially with reference to the foregoing embodiments.

Figure 7:
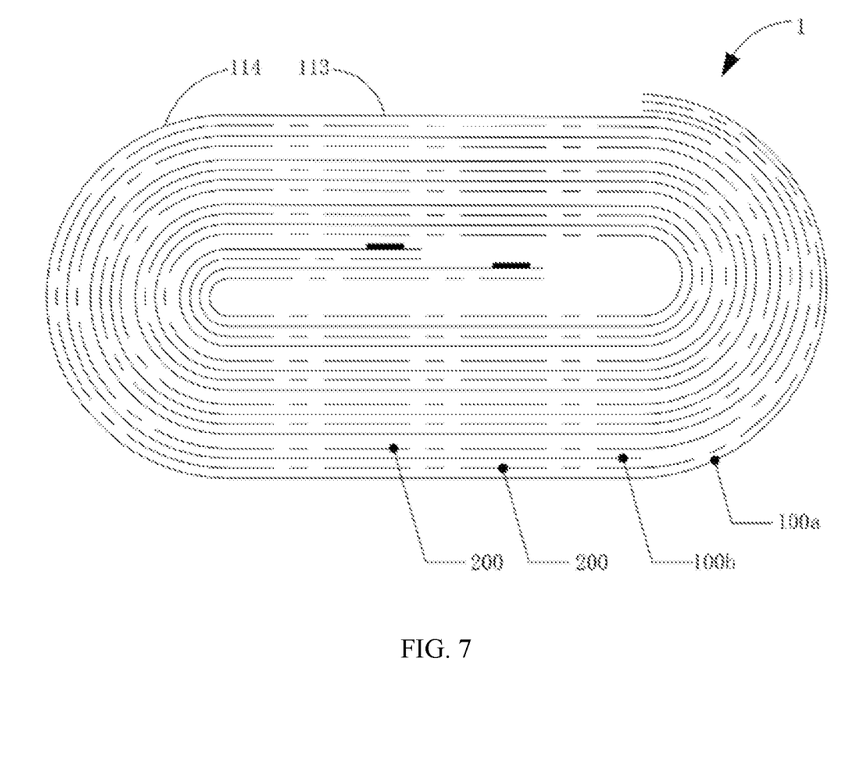
FIG. 7 is a schematic top view of an electrode assembly according to an embodiment of the present application.

The current collector 110 is wound into an elliptical cylindrical shape in the form of a vortex, and, after the winding, forms a plurality of flat portions 113 and curved portions 114 that are stacked. The flat portion 113 means a flat and straight extension part of the wound current collector 110, and the curved portion 114 means a curved extension portion of the wound current collector 110.

To facilitate fixing and mounting of the connecting piece 120, the fixed end 121 of the connecting piece 120 is connected to one of the flat portions 113. The free end 122 is disposed toward the connected flat portion 113 and is close to or fits snugly with the connected flat portion 113. Specifically, with reference to the foregoing embodiments, the connecting piece 120 is formed by extending outward from an edge of the connected flat portion 113, and is bent toward the flat portion 113 until being close to or fitting snugly with the flat portion 113. Optionally, an end of the current collector 110, which is located at the center of the electrode assembly 1, is an inner end. The inner end is located in a flat portion 113 of the current collector 110. The connecting piece 120 is connected to the inner end, and is formed by extending outward from the lengthwise edge of the current collector 110 and is bent toward the inner end until being close to or fitting snugly with the inner end. Understandably, in other embodiments of the present application, the connecting piece 120 may be formed by extending outward from the widthwise edge of the current collector 110, and may be bent toward the inner end until being close to or fitting snugly with the inner end.

A first end 131 of the tab 130 is fixed to the connecting piece 120, and a second end 132 is disposed beyond the flat portion 113 so as to extend beyond the current collector 110. The active electrode material layer 140 is disposed on a main surface and a rear surface of the current collector 110. Similarly, to ensure good consistency of the thickness of the first electrode plate 100a at different positions, a region of the flat portion 113 connected to the connecting piece 120, which is directly oriented toward the connecting piece 120, is not coated with the active electrode material layer 140.

In conclusion, due to the electrode plate disclosed in the foregoing embodiment, the electrode assembly 1 can reduce the risks of failure of the tab caused by dropping of the battery cell or electric device that contains the electrode assembly 1. In addition, the second electrode plate 100b may also be the electrode plate 100 disclosed in the foregoing embodiment.

Figure 8:
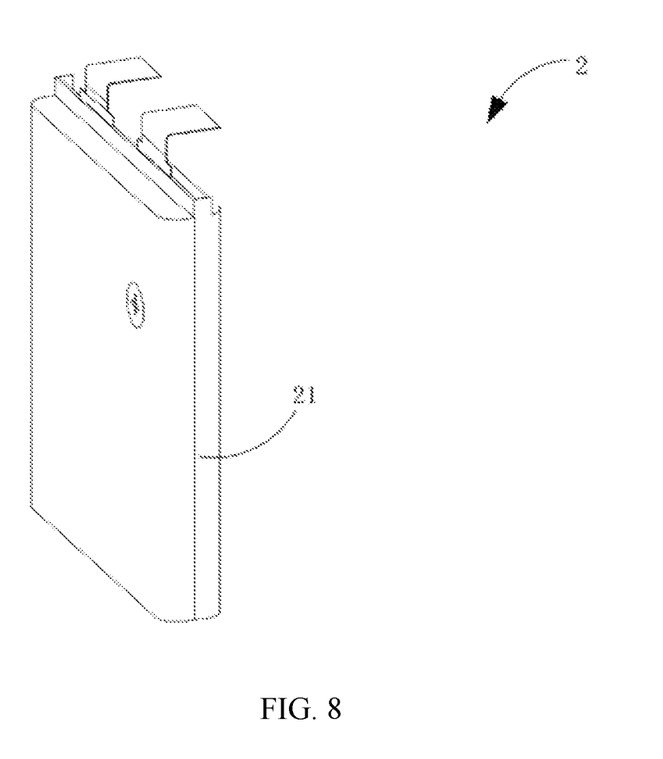
FIG. 8 is a three-dimensional schematic diagram of a battery cell according to an embodiment of the present application.

Based on the same inventive concept, the present application further provides a battery cell. Referring to FIG. 8, which is a three-dimensional schematic diagram of the battery cell 2, and also referring to FIG. 1 to FIG. 7, the battery cell 2 includes a housing 21 and the electrode assembly 1 disclosed in the foregoing embodiment. The housing 21 is configured to accommodate the electrode assembly 1. The battery cell 2 also includes the electrode plate 100 disclosed in the foregoing embodiment, and therefore, the battery cell 2 can also reduce the risks of failure of the tab caused by dropping of the battery cell, and reduce the risks of failure of the tab caused by dropping of an electric device that contains the battery cell 2.

Figure 9:
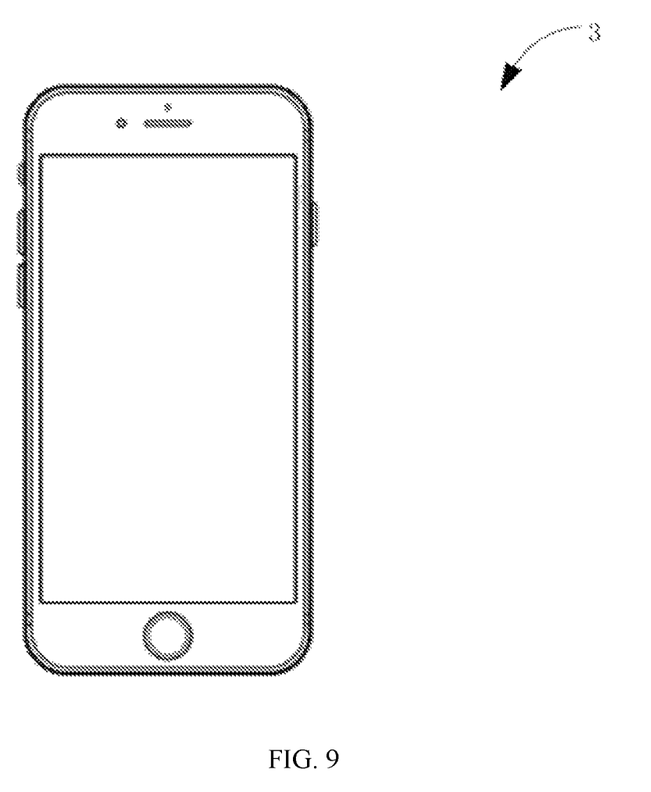
FIG. 9 is a three-dimensional schematic diagram of an electric device according to an embodiment of the present application.

Based on the same inventive concept, the present application further provides an electric device. Referring to FIG. 9, which is a schematic diagram of the electric device 3, and also referring to other drawings, the electric device 3 includes a load (not shown in the drawing) and the battery cell 2 disclosed in the foregoing embodiment. The battery cell 2 is configured to supply power to the load. In this embodiment, the electric device 3 is a mobile phone. Understandably, in other embodiments of the present application, the electric device 3 may be a tablet, a computer, an unmanned aerial vehicle, or other devices driven by electric energy. This is not limited herein. The electric device 3 also includes the electrode plate 100 disclosed in the foregoing embodiment, and therefore, the electric device can also reduce the risks of failure of the tab caused by dropping of the electric device.

Finally, it needs to be noted that the foregoing embodiments are merely intended to describe the technical solutions of the present application, but not intended to limit the present application. Based on the concept of the present application, the foregoing embodiments may be combined and the technical features in different embodiments may be combined, the steps may be implemented in any order, and many other variations may be made to different aspects of the present application described above, which, for brevity, are not provided herein in detail. Although the present application is described in detail with reference to the foregoing embodiments, a person of ordinary skill in the art understands that modifications may still be made to the technical solutions described in the foregoing embodiments, or equivalent substitutions may still be made to some technical features in the technical solutions, and the modifications or substitutions do not make the essence of the corresponding technical solutions depart from the scope of the technical solutions of the embodiments of the present application.

What is claimed is:

1. A battery cell, comprising:
an electrode assembly and a housing accommodating the electrode assembly, wherein the electrode assembly comprises a first electrode plate and a second electrode plate alternately arranged and wound together to form a roll;
wherein the first electrode plate comprises:
a current collector, comprising a plurality of flat portions and a plurality of curved portions,
a connecting piece comprising a fixed part having a fixed end and a free part having a free end opposing the fixed end, wherein the fixed end is connected to one of the flat portions of the current collector, the fixed part overlaps with the connected flat portion, and the free end extends away from the connected flat portion in a direction perpendicular to a length direction of the current collector, the free part does not overlap with the current collector, and wherein the connecting piece is made of a flexibly bendable material; and
a tab, wherein a first end of the tab is fixed to the free part of the connecting piece, the tab and the connected flat portion are disposed on different sides of the connecting piece, and a second end of the tab extends beyond the connected flat portion.

2. The battery cell according to claim 1, wherein the connecting piece and the current collector are integrally formed.

3. The battery cell according to claim 2, wherein the connecting piece is formed by extending outward from an edge of the connected flat portion, and is bent towards the connected flat portion.

4. The battery cell according to claim 3, wherein a direction in which the fixed end points to the free end is opposite to a direction in which the first end points to the second end.

5. The battery cell according to claim 2, wherein an inner end of the current collector at a center of the electrode assembly is located in a flat portion of the current collector, the connecting piece is connected to the inner end, and the connecting piece is formed by extending outward from a lengthwise edge of the current collector and is bent toward the inner end.

6. The battery cell according to claim 2, wherein an inner end of the current collector at a center of the electrode assembly is located in a flat portion of the current collector, the connecting piece is connected to the inner end, and the connecting piece is formed by extending outward from a widthwise edge of the current collector and is bent toward the inner end.

7. The battery cell according to claim 1, wherein the first electrode plate further comprises an active electrode material layer, and a surface of the current collector is coated with the active electrode material layer.

8. The battery cell according to claim 7, wherein a region of the connected flat portion is not coated with the active electrode material layer and wherein the region of the connected flat portion is directly oriented towards the connecting piece.

9. The battery cell according to claim 1, wherein one of the first electrode plate or the second electrode plate is a positive electrode plate, and the other is a negative electrode plate.

10. An electric device, comprising a load and a battery cell configured to supply power to the load, the battery cell comprising an electrode assembly and a housing accommodating the electrode assembly, wherein the electrode assembly comprises a first electrode plate and a second electrode plate alternately arranged and wound together to form a roll;

wherein the first electrode plate comprises:
 a current collector, comprising a plurality of flat portions and a plurality of curved portions;
 a connecting piece, comprising a fixed part having a fixed end and a free part having a free end opposing the fixed end, wherein the fixed end is connected to one of the flat portions of the current collector, the fixed part overlaps with the connected flat portion, and the free end extends away from the connected flat portion in a direction perpendicular to a length direction of the current collector, the free part does not overlap with the current collector, and wherein the connecting piece is made of a flexibly bendable material; and
 a tab, wherein a first end of the tab is fixed to the free part of the connecting piece, the tab and the connected flat portion are disposed on different sides of the connecting piece, and a second end of the tab extends beyond the connected flat portion.

11. The electric device according to claim 10, wherein the connecting piece and the current collector are integrally formed.

12. The electric device according to claim 11, wherein the connecting piece is formed by extending outward from an edge of the connected flat portion, and is bent toward the connected flat portion.

13. The electric device according to claim 12, wherein a direction in which the fixed end points to the free end is opposite to a direction in which the first end points to the second end.

14. The electric device according to claim 11, wherein an inner end of the current collector at a center of the electrode assembly is located in a flat portion of the current collector, the connecting piece is connected to the inner end, and the connecting piece is formed by extending outward from a lengthwise edge of the current collector and is bent toward the inner end.

15. The electric device according to claim 11, wherein an inner end of the current collector at a center of the electrode assembly is located in a flat portion of the current collector, the connecting piece is connected to the inner end, and the connecting piece is formed by extending outward from a widthwise edge of the current collector and is bent toward the inner end.

16. The electric device according to claim 10, wherein the first electrode plate further comprises an active electrode material layer, and a surface of the current collector is coated with the active electrode material layer.

17. The electric device according to claim 16, wherein a region of the connected flat portion is not coated with the active electrode material layer, and wherein the region of the connected flat portion is directly oriented towards the connecting piece.

18. The electric device according to claim 10, wherein one of the first electrode plate or the second electrode plate is a positive electrode plate, and the other is a negative electrode plate.

* * * * *